W. COX.
WATER COOLED GLASS ROLLER.
APPLICATION FILED JAN. 19, 1920.
1,392,626.   Patented Oct. 4, 1921.
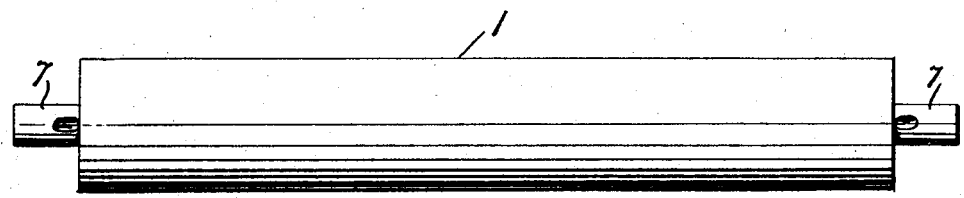
FIG. 1.
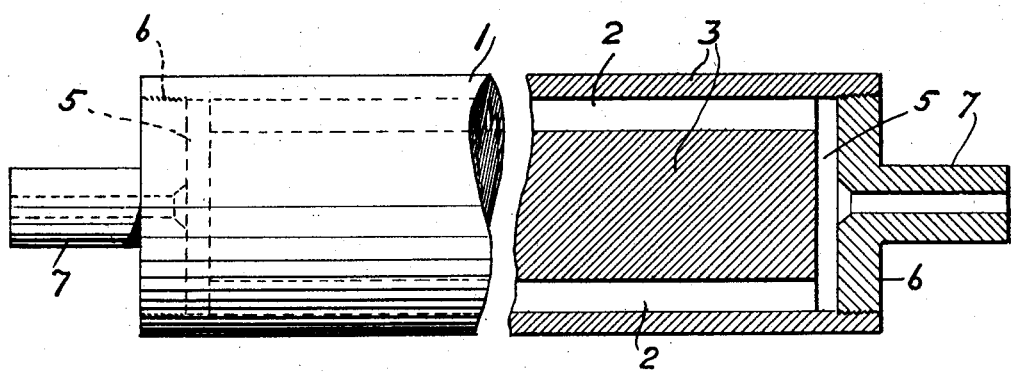
FIG. 2.
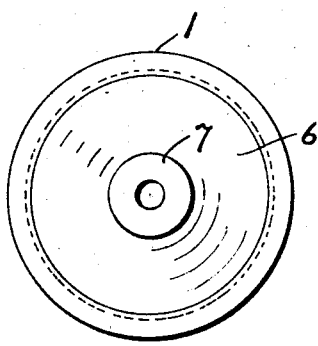   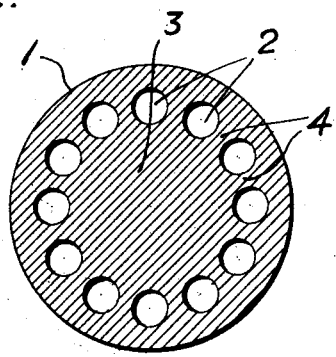
FIG. 3.   FIG. 4.
WITNESS:
Rob R Mitchel
INVENTOR
Walter Cox
BY
Augustus B. Stoughton
ATTORNEY.

UNITED STATES PATENT OFFICE.

WALTER COX, OF PHILADELPHIA, PENNSYLVANIA.

WATER-COOLED GLASS-ROLLER.

1,392,626.  Specification of Letters Patent.  Patented Oct. 4, 1921.

Application filed January 19, 1920. Serial No. 352,580.

*To all whom it may concern:*

Be it known that I, WALTER COX, a citizen of the United States, residing at Philadelphia, in the county of Philadelphia and State of Pennsylvania, have invented a certain new and useful Water-Cooled Glass-Roller, of which the following is a specification.

In use the surface of a roller used in rolling glass is subjected to the uneven application of heat, for example when the pour of molten glass is made on the table and in front of the roller, for then one part of the surface is exposed to the air and another part of the surface of the roller is exposed to the hot glass, and the uneven application of heat to the surface of the roller causes a difference in temperature between different parts of the roller which warps the roller both transiently and permanently so that it loses its true cylindrical form and becomes somewhat elliptical in cross-section, and this deformation of the roller causes imperfections in the rolled sheet of glass.

The principal object of the present invention is to overcome the above mentioned defects and disadvantages and to provide a water cooled glass roller structure to which water may be applied in such a way that the roller will retain its cylindrical form under all conditions of use.

To this and other ends hereinafter set forth, the invention, generally stated, comprises a metal cylinder having a circular row of spaced water channels extending axially through its body and arranged near its surface in position for quickly and effectively withdrawing heat from the part of the surface most exposed to it and providing between and around them a solid metal core and supports, or masses, for absorbing heat and for resisting warping, and having at the ends inlet and outlet water connections communicating with said channels, and The invention consists in the improvements to be presently described and finally claimed.

In the following description reference will be made to the accompanying drawings, forming part hereof, and in which—

Figure 1, is an elevational view of a water cooled glass roller embodying features of the invention.

Fig. 2, is a similar view, partly in section, of parts of the same, drawn to an enlarged scale.

Fig. 3, is an end view, and

Fig. 4, is a transverse sectional view taken through the body of the roller.

In the drawings 1 is a metal cylinder having a circular, or substantially circular, row of spaced parallel water channels 2, extending axially through its body and arranged near its surface and providing between and around them a solid metal core 3, and solid metal supports 4. At the ends of the roller are extensions containing chambers 5, in communication with the channels 2, and these end extensions are stopped with plugs 6, provided with hollow trunnions 7, constituting water connections.

By the described roller construction the capacity of the channels 2, can be made sufficient to carry off such heat applied to parts of the surface of the roller as would raise the temperature at those parts in respect to the temperature at other parts sufficiently to warp it, and in the described construction the cooling water is applied close to the surface of the roller and in position to carry off heat applied to a part of the surface before it can cause warping in respect to other and cooler parts of the roller, or in other words, such differences in temperature of the metal at different points around the cylinder as would cause warping are prevented by the quick removal of heat from that part of the roller which is exposed to the hot glass.

Moreover the solid core 3, and solid supports 4, not only afford mechanical strength for opposing warping, but also constitute masses which by heat convection, in connection with the described water circulation, tend to make the temperature of the surface of the roller exposed to the air and the temperature of the surface of the roller exposed to the molten glass sufficiently uniform to avoid warping.

The mode of operation may be explained by saying the described location and arrangement of the channels 2, provides for the application of sufficient water in close enough proximity with the part of the surface of the roller exposed to a higher degree of heat than the rest of the surface of the roller for confining the difference in temperature at different parts of the surface within limits which permit the mechanical strength of the metal core and supports 4, to resist warping and preserve the true cylindrical form of the roller thus improving the rolled glass sheets.

In the foregoing description and in the following claims reference is made to the described roller as "a glass roller" but in doing this I do not intend to limit my invention to glass but on the contrary reserve to myself all the uses of which it is capable.

I claim:

1. A water cooled glass roller consisting of a metal cylinder having a circular row of spaced parallel water channels extending axially through its body and arranged near its surface and providing between and around them a metal core and solid metal supports and having at the ends inlet and outlet water connections communicating with said channels in multiple, substantially as described.

2. A water cooled glass roller consisting of a metal cylinder having a circular row of spaced parallel water channels extending axially through its body and arranged near its surface and providing between and around them a metal core and solid metal supports and having end extensions containing water chambers common to said channels and provided with water connections, substantially as described.

3. A water cooled glass roller consisting of a metal cylinder having a circular row of spaced parallel water channels extending axially through its body and arranged near its surface and providing between and around them a metal core and solid metal supports and having end extensions containing water chambers common to said channel, and plugs closing said chambers and provided with hollow trunnions constituting water connections.

WALTER COX.